United States Patent [19]
Lebby et al.

[11] Patent Number: 5,511,138
[45] Date of Patent: Apr. 23, 1996

[54] INTERLOCKING WAVEGUIDE AND METHOD OF MAKING

[75] Inventors: Michael S. Lebby, Apache Junction; Christopher K. Y. Chun, Gilbert; Davis H. Hartman, Phoenix, all of Ariz.

[73] Assignee: Motorola, Schaumburg, Ill.

[21] Appl. No.: 265,859

[22] Filed: Jun. 27, 1994

[51] Int. Cl.⁶ .................................................. G02B 6/12
[52] U.S. Cl. ............................................ 385/14; 385/129
[58] Field of Search .............................. 385/14, 129, 130, 385/131, 132

[56] References Cited

U.S. PATENT DOCUMENTS

| | | | |
|---|---|---|---|
| 5,064,263 | 11/1991 | Stein | 385/24 X |
| 5,109,449 | 4/1992 | Newberg et al. | 385/24 X |
| 5,123,078 | 6/1992 | Thomas | 385/129 X |
| 5,218,663 | 6/1993 | Isono et al. | 385/129 |
| 5,299,276 | 3/1994 | Okamura et al. | 385/129 X |

*Primary Examiner*—Akm E. Ullah
*Attorney, Agent, or Firm*—Gary F. Witting; Eugene A. Parsons

[57] ABSTRACT

An adjoining waveguide and optical connector is provided. A waveguide including a first end surface, a second end surface, and an adjoining surface is formed. The adjoining waveguide further includes a core region that extends from the first end surface to the second end surface and a cladding region that surrounds the core region. The first end surface and the second end surface of the waveguide exposes a portion of the core region that is used for optical coupling. The joining surface forms an interconnecting surface for another waveguide.

19 Claims, 3 Drawing Sheets

INTERLOCKING WAVEGUIDE AND METHOD OF MAKING

BACKGROUND OF THE INVENTION

This invention relates, in general to fabrication of optical devices and, more particularly, to manufacturing and fabrication of optical waveguides.

This application is related to U.S. Patent having U.S. Pat. No. 5,265,184 issued on Nov. 23, 1993, and copending patent application having Ser. No. 08/000,865 titled Modular Optical Waveguide and Method of Making filed on Jan. 5, 1993, which are hereby incorporated by reference herein.

At present, optical waveguides are made in a variety of methods, such as photolithography, diffusion, ion implantation, or a combination of any of the above. Generally, these methods used for manufacturing conventional waveguides are inflexible, complex, inefficient, and generally are not suitable for high volume manufacturing. As use of optical waveguides and optical interconnects increases, the need for a fabrication method and structure that allows flexibility, efficiency, and cost effective manufacturing will be required.

Additionally, use of the present methods for manufacturing waveguides and optical interconnects do not provide sufficient flexibility for manufacturing multiple waveguides or modular waveguides, thereby making waveguides difficult to assemble and to assimilate into standard electronics circuits and electronic components. As a result of these inflexible conventional methods, waveguides are severely limited, thereby limiting optical integration into standard electronic components, into standard electronic equipment, and into standard electronic circuits, thus limiting introduction and use of waveguides in high volume applications.

Further, conventional or present methods for manufacturing waveguides generally require individual processing that is achieved manually. Manual processing injects many problems into manufacturing, such as being extremely labor intensive and costly. Additionally, manual manufacturing of waveguides does not enable high volume manufacture, thus not enabling waveguides to be produced or used in high volume applications. Moreover, since present design of waveguides does not readily lend itself to automated manufacturing, waveguide design further limits implementation of waveguides into high volume applications, thus causing limited use of waveguides and electronic products.

It can be readily seen that conventional methods for designing and manufacturing of waveguides have severe limitations. Also, it is evident that conventional methods for manufacturing waveguides are not only ineffective, expensive, and complex, but also do not lend themselves to high volume manufacturing. Waveguides manufactured with the present methods are not designed modularity so as to facilitate flexibility in design, thus further removing them from high volume manufacturing and incorporation into standard electronic components. Therefore, an article and method for manufacturing waveguides that is modular in design, flexible in design, and is amenable to high volume manufacturing would be highly desirable.

SUMMARY OF THE INVENTION

Briefly stated, an adjoining waveguide is provided. A waveguide including a first surface, a second surface, and a joining surface is formed. The waveguide further includes a core region that extends from the first surface to the second surface in a cladding region that surrounds the core region. The first surface and the second surface of the waveguide have exposed portions of the core region that are used for optical coupling. The joining surface is formed for interconnecting to another adjoining waveguide.

An advantage of the present invention allows modular coupling of adjoining waveguides, thereby increasing flexibility of design.

Another advantage of the present invention allows adjoining waveguides to be manufactured in a high volume manufacturing setting, thereby enabling the adjoining waveguide to be manufactured in an inexpensive manner.

DETAILED DESCRIPTION OF THE DRAWINGS

Figure 1:
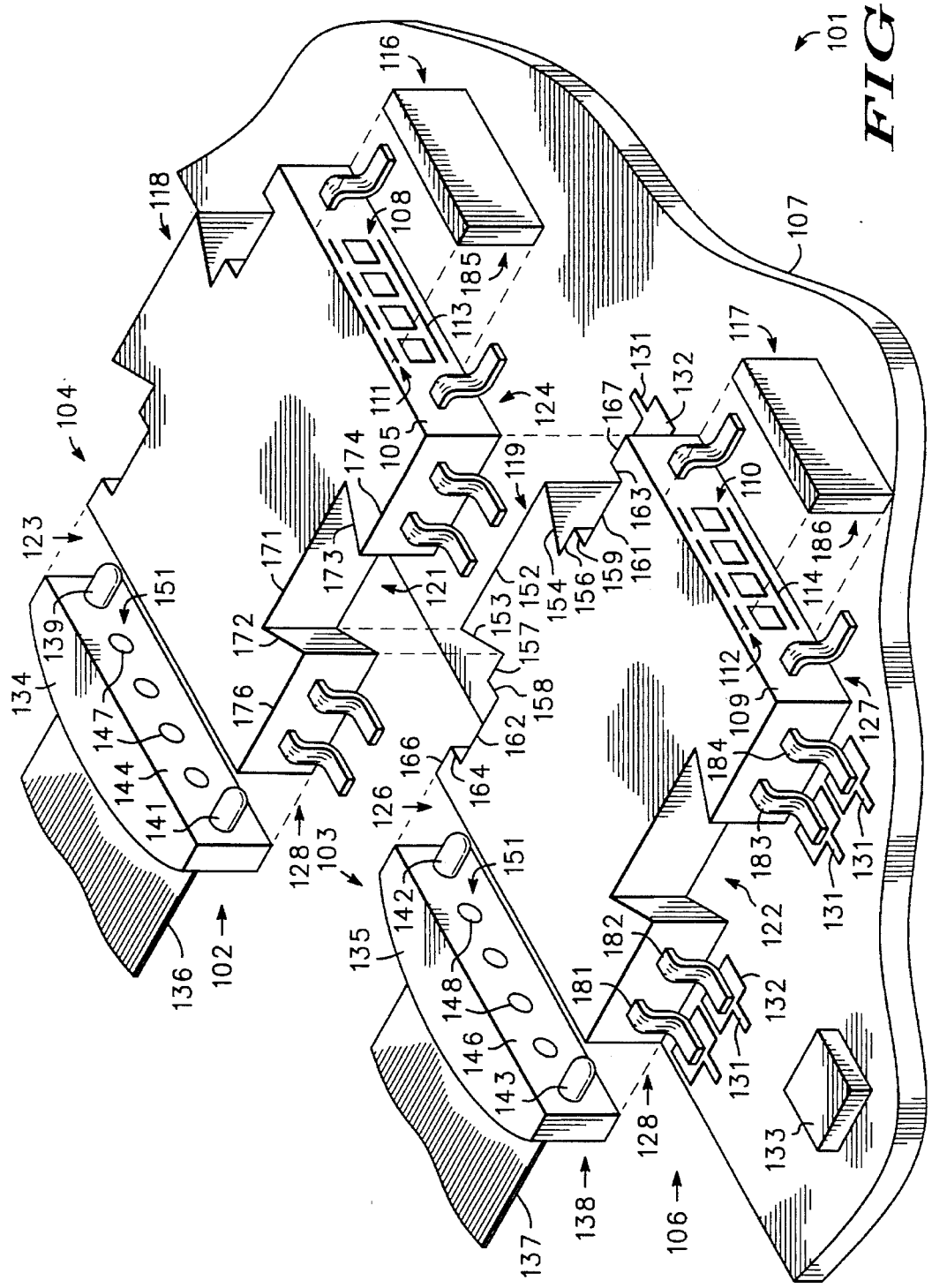
FIG. 1 is an enlarged simplified partially exploded, perspective view of adjoining waveguides on an interconnect substrate.

FIG. 1 illustrates an enlarged simplified partially exploded, perspective view of an optical module 101 with optical connectors 102 and 103. Optical module 101 includes individual adjoining waveguides interlocking waveguides 104 and 106 and an interconnect substrate 107. Adjoining waveguides 104 and 106 are fabricated having several main components, such as a plurality of core regions 108 and 110, a plurality of electrical contacts 111 and 112, ground contacts 113 and 114, photonic devices 116 and 117, joining surfaces 118 and 119, receiving surfaces 121 and 122, end surfaces 123, 124 and 126, 127, and electrical output members 128, respectively. Interconnect substrate 107 is also fabricated with several main components, such as a plurality of electrical traces 131, a plurality of bonding pads 132, and an integrated circuit (IC) 133.

Optical connectors 102 and 103 are fabricated having several main components, such as bodies 134 and 135, optical cables 136 and 137, alignment guide system 138 having alignment pins 139, 141, 142, and 143, optical interface surface 144 and 146 having exposed surfaces 147 and 148 of a plurality of optical fibers 149 and 151, respectively.

Generally, any suitable method is used for fabricating optical connectors 102 and 103, such as molding, milling, or the like. Optical connectors 102 and 103 are made having a specified distance between individual optical fibers of the plurality of optical fibers 149 and 151, thereby allowing the individual optical fibers of the plurality of optical fibers 149 and 151 to be positioned or aligned correctly into individual core regions of the plurality of core regions 108 and 110 when interface surfaces 144 and 146 and end surfaces 123 and 126 are operatively coupled or engaged, respectively. Alignment of optical connectors 102 and 103 to adjoining waveguides 104 and 106 is achieved by any suitable alignment system.

For example, as shown in FIG. 1, alignment pins 139 and 141, and alignment pins 142 and 143 of optical connectors 102 and 103, respectively, are used to guide optical connectors 102 and 103 to adjoining waveguides 104 and 106, respectively, thereby ensuring proper optical coupling.

Photonic devices 116 and 117 having working portions 185 and 186, respectively, are made by any suitable method. Further, photonic devices 116 and 117 are made having any suitable device type such as a phototransmitter, a photoreceiver, or combination thereof. When photonic devices 116 and 117 are phototransmitters, any suitable phototransmitter is used, such as a light emitting diode, a laser, i.e., a vertical cavity surface emitting laser, ridge emitting laser, or the like. When photonic devices 116 and 117 are photoreceivers, any suitable photoreceiver is used, such as a photo diode, a p-i-n photodiode, or the like.

Typically, photonic devices 116 and 117 are operably coupled to adjoining waveguides 104 and 106. More specifically, working portions 185 and 186 of photonic devices 116 and 117 are aligned, mounted, and operably coupled so that working portions, illustrated by working portions 185 and 186, are directed into appropriate core regions 108 and 110, respectively. Electrical coupling of photonic devices 116 and 117 to interconnect substrate 107 is achieved by any suitable method; however, as illustrated in FIG. 1, electrical coupling of photonic devices 116 and 117 is achieved by electrically bonding at least one contact of photonic devices 116 and 117 to an electrical contact of the plurality of electrical contacts 111 and 112, respectively. It should be understood that the plurality of electrical contacts illustrated on end surfaces 124 and 127 are spaced so as to accept contacts from photonic devices 116 and 117. Further, it should be understood that the plurality of electrical contacts 111 and 112 are electrically integrated to electrical output members 128 so as to transmit or receive electrical signals from or to photonic devices 116 and 117 which are subsequently passed to interconnect substrate 107.

Interconnect substrate 107 is made of any suitable substrate, such as a printed circuit board (PC), a printed wire board (PWB), a silicon interconnect board, or the like. For the sake of simplicity and to more clearly illustrate the present invention, interconnect substrate 107 is simply shown having a plurality of bonding pads 132 with a plurality of electrical traces 131. It should be understood that the plurality of electrical traces 131 can be electrically coupled to any suitable output apparatus, such as electrical pins, e.g., a pin grid array (PGA), electrically conductive bumps, e.g., solder bumps, gold bump, conductive epoxies for bump bonding, electrical leads, e.g., a lead frame, or the like.

Generally, the plurality of core regions 108 and 110 and cladding regions 105 and 109 are made of hard optical transparent polymer, wherein the plurality of core regions 108 and 110 have a higher refractive index than does cladding regions 105 and 109, thus allowing for efficient light confinement, efficient light transmission, and efficient internal reflection through the plurality of core regions 108 and 110. Commonly, there is a refractive index difference of at least 0.01 between the plurality of core regions 108 and 110 and cladding regions 105 and 109, respectively. Additionally, cladding regions 105 and 109 are capable of being made of translucent material while maintaining an appropriate refractive index as described hereinabove.

The translucent material is generally made by an addition of fillers such as silicates, silicas, feldspar, or the like, to provide structural benefits, such as hardness, strength, rigidity. Additionally, these fillers are used to match the coefficient of expansions, increase durability to temperature cycling, and the like, thus enabling the transparent material of the cladding regions to be chemically and materially tailored to specific design requirements.

In the present invention, adjoining waveguides 104 and 106 are fabricated by any suitable method, such as molding, milling, or the like, thereby providing joining surfaces 118 and 119 and receiving surfaces 121 and 122, respectively. In a preferred embodiment of the present invention, adjoining waveguides 104 and 106 are made by molding in accordance with the previously mentioned U.S. Patent '184. Joining surfaces 118 and 119 and receiving surfaces 121 and 122 are made so that joining surface 119 and receiving surface 121 are detachably interlocked, thereby holding adjoining waveguides 104 and 106 together. Joining surface 119 and receiving surface 121 are made with any suitable configuration or type of interlocking structures that allow adjoining waveguides 104 and 106 to be held together, such as dovetails, locks and keys, interlocking wedges, slideable wedges, and the like.

More specifically, by way of example only, with photonic devices already mounted on adjoining waveguides 104 and 106, joining surface 119 and receiving surface 121 are shown in an exploded view so as to illustrate interlocking capabilities of joining and receiving surfaces 119 and 121, respectively. In this particular illustration, joining surface 119 having surfaces 152 through 164 and receiving surface 121 having surfaces 171–176 are shown in a dovetail configuration, thereby allowing joining surface 119 and receiving surface 121 to be frictionally engaged.

By interlocking joining surface 119, i.e., surfaces 152, 153, and 154, with receiving surface 121, i.e., surfaces 171, 172, and 173, adjoining waveguides 104 and 106 are detachably affixed, thereby enabling affixed adjoining waveguides 104 and 106 to be mounted on interconnect substrate 107, thereby electrically coupling interconnect substrate 107 to adjoining waveguides 104 and 106.

Typically, electrical coupling is achieved by electrical output members 181, 182, 183, and 184 being mounted to the plurality of bonding pads 132 of the plurality of electrical traces 131. However, it should be understood that other alternative methods for providing an electrical coupling, such as solder bumps, wire bonding, and the like can be used. As shown in FIG. 1, surface 152, surface 153 and surface 154 of joining surface 119 are interlockably engaged with surfaces 171, 172, and 173 of receiving surface 121. Further, surfaces 172 and 173 of receiving surface 121 and surfaces 153 and 154 of joining surface 119, which are angled, provide a holding apparatus or means for adjoining waveguides 104 and 106. Additionally, surfaces 156 and 157 provide a stopping detent against which surfaces 174 and 176 abut so that adjoining waveguide 104 cannot be moved closer to joining waveguide 106 than specified. Additionally, surfaces 166 and 167 of adjoining waveguide 106 serve a similar function. Also, surfaces 158, 162, and 166, as well as surfaces 159, 161, and 163 form two indented regions on either side of surface 152, thereby enabling electrical output members 128 of adjoining waveguide 104 to be mounted closely to adjoining waveguide 106.

In function, individual adjoining waveguides, such as adjoining waveguides 104 and 106 with photonic devices 116 and 117 operably coupled to adjoining waveguides 104 and 106, respectively, are selected. Optical waveguides adjoining waveguides 104 and 106 are detachably affixed to each other by sliding joining surface 119 and receiving surface 121 together, thereby interlocking or ganging adjoining waveguides 104 and 106 together. The ganged or interlocked adjoining waveguides 104 and 106 are then mounted on interconnect substrate 107.

Typically manufacturing, placement, and mounting of adjoining or optical waveguides 104 and 106 to interconnect substrate 107 is accomplished by an automatic system such as a robot arm, thus reducing cost and increasing accuracy of manufacture. Further, once adjoining waveguides 104 and 106 are mounted on interconnect substrate 107, interconnect substrate 107 and adjoining waveguides 104 and 106 are capable of being overmolded to form an optoelectronic package.

Figure 2:
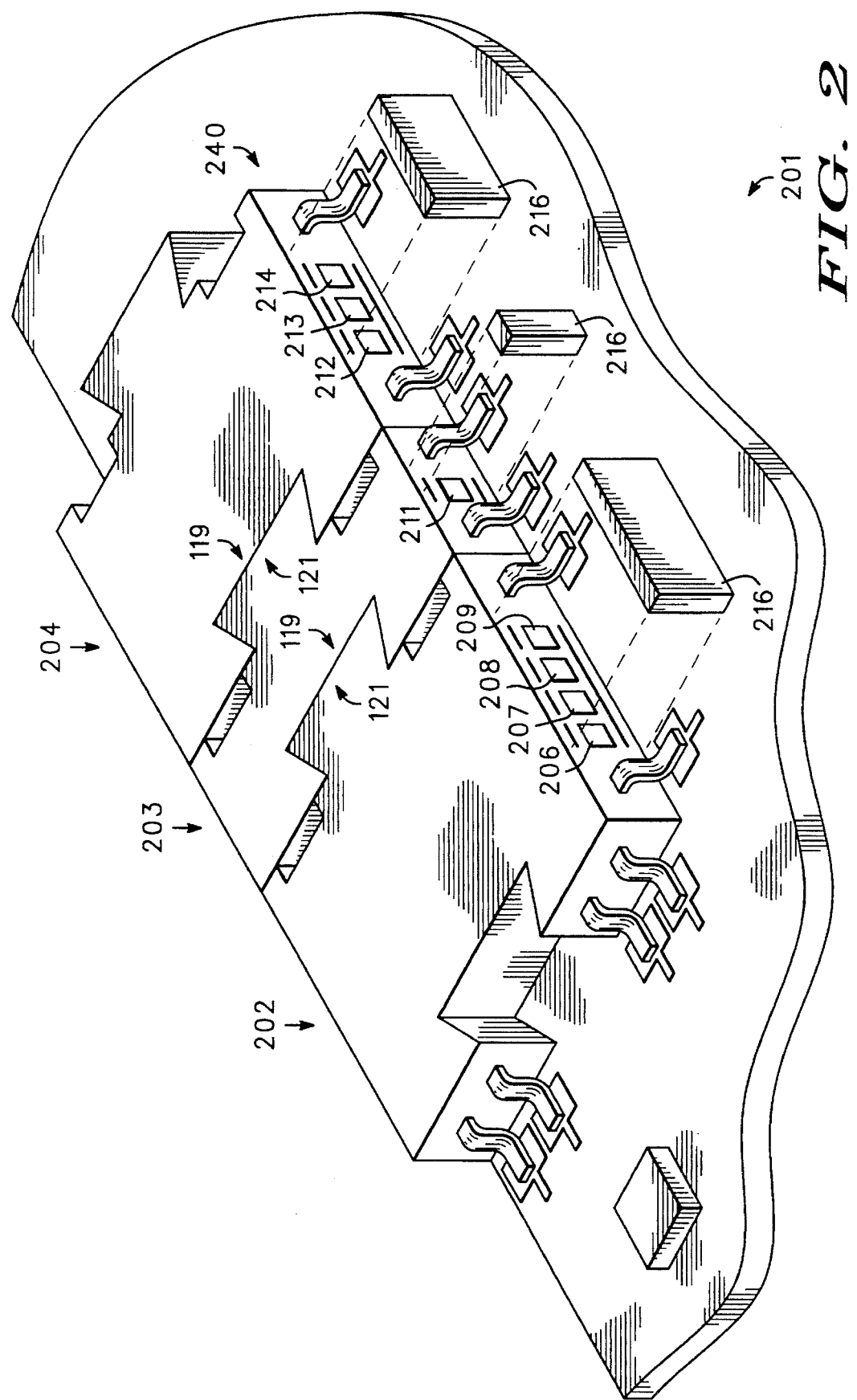
FIG. 2 is an enlarged simplified partially exploded, perspective view of adjoining waveguides on an interconnect substrate, with core regions of the waveguides.

FIG. 2 is an enlarged simplified partially exploded, perspective view of an optical module 201 that includes adjoining waveguides 202, 203, and 204. It should be understood that similar features or elements previously identified in FIG. 1 will retain their original identifying numerals.

As shown in FIG. 2, adjoining waveguides 202, 203, and 204 are illustrated having a different number of core regions, i.e., adjoining waveguides 202, 203, and 204 have four core regions 206, 207, 208, and 209, one core region 211, and three core regions 212, 213, and 214, respectively, thereby illustrating flexibility in design that allows adjoining waveguides to have a varying and different number of core regions. Further, it should be understood that photonic devices 216 are manufactured in accordance to the number of core regions of each individual adjoining waveguides 202, 203, and 204, thus bringing correspondence to the number of core regions of adjoining waveguides 202, 203, and 204 and the number of working portions of photonic devices 216. Additionally, adjoining waveguides 202, 203, and 204 can be manufactured having any suitable numbers of core regions, thus enabling the user to select and join adjoining waveguides 202, 203, and 204 having different number of core regions so as to meet the users design requirements. Further, by utilizing the present invention, the number of core regions or individual adjoining waveguides 202, 203, and 204 can be varied and changed to correspond to a number of optical fibers (not shown) in an optical connector (not shown).

Figure 3:
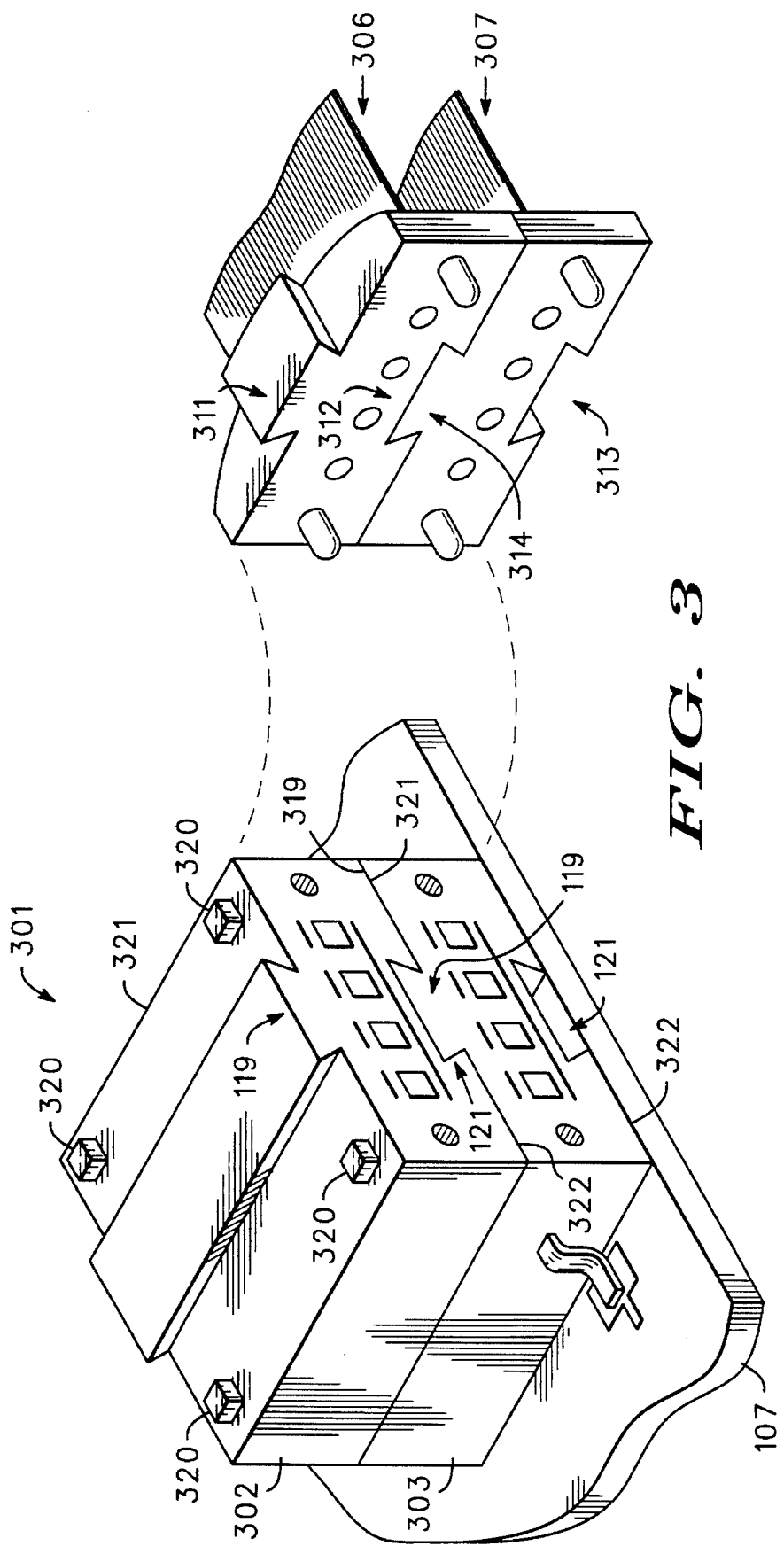
FIG. 3 is an enlarged simplified partially exploded, perspective view of adjoining waveguide and optical connectors that are vertically integrated.

FIG. 3 illustrates an optoelectronic module 301 with optical connectors 306 and 307 that are both vertically integrated. Optoelectronic module 301 includes adjoining waveguides 302 and 303 that have joining surfaces 119 and receiving surfaces 121 located on surfaces 321 and 322, respectively, thereby enabling vertical integration of the adjoining waveguides 302 and 303. Additionally, joining surfaces 119 and receiving surfaces 121 are also disposed in optical connectors 306 and 307, thereby enabling vertical integration of optical connectors 306 and 307. However, with adjoining waveguides 302 and 303 vertically integrated, it should be understood that optical connectors 306 and 307 need not be vertically integrated. By vertically integrating adjoining waveguides 302 and 303, horizontal space of interconnect substrate 107 is saved. Thus, utilization of this horizontal space for other purposes is enabled.

As shown in FIG. 3, tabs or blocks 320 are molded into surfaces in 321 (one of which is fully shown). Additionally, it should be understood that indents (not shown) are molded into surfaces 322 to receive tabs 320 in an interlocking fashion. Thus, when sliding joining surfaces 119 over receiving surfaces 121, bumps 320 and the indents are felt as joining and receiving surfaces 119 and 121 pass over each other, thereby providing alignment of adjoining waveguides 302 and 303, as well as further securing waveguides 302 and 303. Further, it should be understood that optical connectors 306 and 307 can be made in a similar fashion. It should be further understood that in some instances, bumps 320 and the indents are capable of interlocking adjoining waveguides, if joining surfaces 119 and receiving surface 121 are removed.

By now it should be appreciated that there has been provided an improved article and method for making adjoining waveguides. This method and article allows for horizontal and vertical integration of adjoining waveguides and connectors. Additionally, this method provides flexibility and design of a variety of optical devices by joining optical waveguides, thereby enabling optoelectronics to be incorporated into standard electronic components, circuitry, and the like.

We claim:

1. An adjoining waveguide comprising:

an optical waveguide including a first end surface, a second end surface, a joining surface, a core region, and a cladding region, the cladding region surrounds the core region with the first end surface exposing a first portion of the core region and a first portion of the cladding region and the second end surface exposing a second portion of the core region and a second portion of the cladding region with the core region extending from the first end surface to the second end surface of the waveguide; and the joining surface being positioned between the first end surface and the second end surface with an interlocking surface being positioned between the first end surface and the second end surface.

2. An adjoining waveguide as claimed in claim 1 further including an electrical output member having an electrical contact, the electrical output member being embedded into the cladding region with the electrical contact being positioned adjacent to the first portion of the core region exposed on the first end surface of the adjoining waveguide.

3. An adjoining waveguide as claimed in claim 1 further including a photonic device with a working portion, the working portion of the photonic device being directed into the exposed portion of the core region at one of the first and second end surfaces for optical coupling.

4. An adjoining waveguide as claimed in claim 3 wherein the photonic device is a phototransmitter.

5. An adjoining waveguide as claimed in claim 3 wherein the photonic device is a photoreceiver.

6. An adjoining waveguide as claimed in claim 1 wherein the the joining surface is a key.

7. An adjoining waveguide as claimed in claim 1 wherein the joining surface is a lock.

8. An adjoining waveguide as claimed in claim 1 further including an alignment guide on the second end surface.

9. An interlocking waveguide comprising:

a plastic optical waveguide having a first end surface, a second end surface, a joining surface, a core region, and a cladding region, the cladding region surrounds the core region with the first end surface exposing a portion of the core region and a portion of the cladding region and with the core region extending from the first end surface to the second end surface, and the joining surface located between the first end surface and the second end surface having an interlocking surface for detachably affixing another optical waveguide thereto;

an electrically conductive member having a contact integrated into the cladding region with the contact being positioned adjacent to the core region and being exposed on the first end surface of the optical waveguide for electrically conducting signals; and a photonic device with a working portion and a contact, the working portion of the photonic device operably coupled to the exposed portion of the first end surface and the contact of the photonic device operably coupled to the electrically conductive member.

10. An interlocking waveguide as claimed in claim 9 wherein the joining surface of the waveguide is a partial dovetail configuration.

11. An interlocking waveguide as claimed in claim 9 wherein the joining surface of the waveguide is a slideable key.

12. An interlocking waveguide as claimed in claim 9 further including an interconnect substrate with a plurality of electrical traces, the waveguide mounted on the interconnect substrate so that the electrically conductive member of the waveguide and one of the plurality of electrical tracings of the interconnect board are operably coupled.

13. An interlocking waveguide as claimed in claim 9 wherein the electrically conductive member is imbedded in the cladding region.

14. An interlocking waveguide as claimed in claim 13 wherein the electrically conductive member imbedded in the cladding region further includes a contact positioned on the first end surface for electrically coupling the photonic device to the electrically conductive member.

15. An interlocking waveguide as claimed in claim 9 wherein the photonic device is a phototransmitter.

16. An interlocking waveguide as claimed in claim 9 wherein the photonic device is a photoreceiver.

17. An interlocking waveguide as claimed in claim 9 further including an alignment guide located on the second end surface.

18. A method for making an adjoining waveguide comprising the steps of:

forming an optical waveguide including a first end surface, a second end surface, a joining surface, a core region, and a cladding region, the cladding region surrounds the core region with the first end surface exposing a portion of the core region and a portion of the cladding region and the core region extending from the first end surface to the second end surface of the optical waveguide;

the joining surface having an interlocking surface being positioned between the first end surface and the second end surface for interlocking another waveguide.

19. A method for making an adjoining waveguide where, in the step of forming an optical waveguide, the optical waveguide is formed by molding.

* * * * *